(12) United States Patent
Kita et al.

(10) Patent No.: US 8,137,840 B2
(45) Date of Patent: Mar. 20, 2012

(54) NONAQUEOUS SECONDARY BATTERY AND METHOD OF USING THE SAME

(75) Inventors: Fusaji Kita, Ibaraki (JP); Hideki Tsubata, Ibaraki (JP); Hiroyasu Inoue, Ibaraki (JP)

(73) Assignee: Hitachi Maxell Energy, Ltd., Otokuni-Gun, Kyoto (JP)

( * ) Notice: Subject to any disclaimer, the term of this patent is extended or adjusted under 35 U.S.C. 154(b) by 618 days.

(21) Appl. No.: 11/727,635

(22) Filed: Mar. 27, 2007

(65) Prior Publication Data

US 2007/0224505 A1    Sep. 27, 2007

(30) Foreign Application Priority Data

Mar. 27, 2006    (JP) ................. P2006-084384

(51) Int. Cl.
*H01M 4/00*    (2006.01)

(52) U.S. Cl. ..... 429/220; 429/209; 429/212; 429/218.1; 429/224

(58) Field of Classification Search ........................ None
See application file for complete search history.

(56) References Cited

U.S. PATENT DOCUMENTS

| | | | | |
|---|---|---|---|---|
| 6,338,920 B1 * | 1/2002 | Yoshida et al. | ................ | 429/304 |
| 6,737,195 B2 * | 5/2004 | Kweon et al. | ................ | 429/223 |
| 6,746,800 B1 | 6/2004 | Sunagawa et al. | | |
| 2002/0037450 A1 | 3/2002 | Suzuki et al. | | |
| 2002/0102204 A1 * | 8/2002 | Kohiro et al. | ................ | 423/594 |
| 2003/0068551 A1 | 4/2003 | Fukunaga et al. | | |
| 2005/0069775 A1 | 3/2005 | Hwang et al. | | |

FOREIGN PATENT DOCUMENTS

| | | |
|---|---|---|
| JP | 11-54122 A | 2/1999 |
| JP | 2000-082466 | 3/2000 |
| JP | 2000-315503 A | 11/2000 |
| JP | 2002-56896 A | 2/2002 |
| JP | 2002-270238 A | 9/2002 |
| JP | 2003-45432 A | 2/2003 |
| JP | 2004-281158 A | 10/2004 |
| JP | 2005-26141 A | 1/2005 |
| JP | 2005-108810 A | 4/2005 |

OTHER PUBLICATIONS

Japanese Office Action dated Sep. 12, 2011 for the Japanese Application No. JP2006-084384.

* cited by examiner

*Primary Examiner* — Cynthia Lee
(74) *Attorney, Agent, or Firm* — Birch, Stewart, Kolasch & Birch, LLP

(57) ABSTRACT

A nonaqueous secondary battery containing a positive electrode having a positive electrode mixture layer, a negative electrode, and a nonaqueous electrolyte, in which the positive electrode comprises, as active materials, three or more lithium-containing transition metal oxides having different average particle sizes, those transition metal oxides comprise a transition metal element, the transition metal element of the transition metal oxide having the smallest average particle size is partially substituted with a metal element other than the transition metal element, and the density of the positive electrode mixture layer is t 3.8 $g/cm^3$ or more.

10 Claims, 2 Drawing Sheets

(a)

(b)

NONAQUEOUS SECONDARY BATTERY AND METHOD OF USING THE SAME

FILED OF THE INVENTION

The present invention relates to a nonaqueous secondary battery and a method of using the same.

RELATED ART

In recent years, the secondary battery is an indispensable, important device as a power source of a personal computer or a cellular phone, or a power source for an electric vehicle or an electric power storage.

In particular, in applications for a mobile communication device such as a portable computer and a personal digital assistant, the battery is required to be made smaller and to trim weight. Under the current circumstances, however, the system of the battery is not easily made compact or lightweight, since an electric power consumed by a back light of a liquid crystal display panel or consumed to control the drawing of graphics is large, or the capacity of a secondary battery is not sufficiently large. In particular, a personal computer is progressively multi-functionalized by mounting a digital versatile disc (DVD) drive and so on. Thus, the power consumption thereof tends to increase. For this reason, it is highly required to increase the electric capacity of a secondary battery, in particular, the discharge capacity, when the voltage of a single battery is 3.3 V or higher.

Attention is paid to electric vehicles, which discharge no exhaust gas and make less noise in association with the increase of global environmental problems. Recently, hybrid electric vehicles (HEV), which adopt a system of storing regenerative energy generated at the time of braking in a battery and making effective use of the energy, or using an electric energy stored in a battery at the time of engine starting to increase the efficiency of the engine system, have gained popularity. However, since the electric capacity of the currently used battery is small, a plurality of batteries should be used to generate a sufficient voltage. For this reason, problems such that a space in the vehicle should be made smaller and that the stability of the vehicle body deteriorates arise.

Among secondary batteries, a lithium secondary battery using a nonaqueous electrolyte attracts attention, since it generates a high voltage, has a lightweight and is expected to achieve a high energy density. In particular, a lithium secondary battery disclosed in JP-A-55-136131, in which a lithium-containing transition metal oxide, for example, $LiCoO_2$, is used as a positive electrode active material, and metal lithium is used as a negative electrode active material, is expected to attain a high energy density, since it has an electromotive force of 4 V or higher.

However, at present, in the case of a $LiCoO_2$ based secondary battery which uses $LiCoO_2$ as a positive electrode active material and a carbonaceous material such as graphite as a negative electrode active material, a charge final voltage thereof is usually 4.2 V or less. According to this charging condition, the charge capacity is only about 60% of the theoretical capacity of $LiCoO_2$. The electric capacity may be increased by increasing the charge final voltage to higher than 4.2 V. However, with the increase of the charge capacity, the crystalline structure of $LiCoO_2$ decays so that the charge-discharge cycle life may be shortened, or the crystalline structure of $LiCoO_2$ may be destabilized. Accordingly, the thermal stability of the battery deteriorates.

To solve such a problem, many attempts have been made to add a different metal element to $LiCoO_2$ (cf. JP-A-4-171659, JP-A-3-201368, JP-A-7-176302 and JP-A-2001-167763).

In addition, attempts have been made to use a battery in a high-voltage range of 4.2 V or higher (cf. JP-A-2004-296098, JP-A-2001-176511 and JP-A-2002-270238).

In years to come, a secondary battery will be required to have a higher capacity and also better reliability including higher safety than the conventional batteries. In general, the battery capacity can be greatly improved by raising the content of an active material in electrodes or by increasing an electrode density, in particular, the density of a positive electrode mixture layer. However, according to such capacity-increasing measures, the safety of the battery gradually decreases.

Accordingly, in order to meet requirements for the increase of the electric capacity, it is highly desired to provide a battery which uses a material that generates a higher electromotive force (voltage range) than $LiCoO_2$ and has a stable crystalline structure capable of being stably and reversibly charged and discharged, and which further satisfies reliability such that the safety of the conventional batteries can be maintained and the battery does not expand when the density of the positive electrode mixture layer is increased.

When the discharge final voltage of a conventional battery comprising $LiCoO_2$ as a positive electrode active material is made higher than 3.2 V, the battery cannot be completely discharged since the voltage in the final stage of the discharge significantly falls. Thus, an electric quantity efficiency of discharge relative to charging remarkably decreases. Since the complete discharge cannot be attained, the crystalline structure of $LiCoO_2$ easily decays, and thus the charge-discharge cycle life is shortened. This phenomenon remarkably appears in the above-mentioned high voltage range.

Under a charging condition that the final voltage at full charging is set to 4.2 V or higher in the conventional battery, apart from shortening of the charge-discharge cycle life or the decrease of the thermal stability caused by the decay of the crystalline structure of the positive electrode active material, the electrolytic solution (a solvent) is oxidatively decomposed due to the increase of the active sites in the positive electrode active material, whereby a passivation film is formed on the surface of the positive electrode and thus the internal resistance of the battery increases so that the load characteristic may deteriorate.

SUMMARY OF THE INVENTION

An object of the present invention is to provide a nonaqueous secondary battery having a high voltage, a high capacity and high reliability including high safety, and a method of using the same.

Accordingly, the present invention provides a nonaqueous secondary battery comprising: a positive electrode having a positive electrode mixture layer, a negative electrode, and a nonaqueous electrolyte, wherein the positive electrode comprises, as active materials, at least three lithium-containing transition metal oxides having different average particle sizes, the lithium-containing transition metal oxides comprise at least one transition metal element $M^1$ selected from the group consisting of Co, Ni and Mn, the transition metal element $M^1$ of the lithium-containing transition metal oxide having the smallest average particle size is partially substituted with a metal element $M^2$ other than the transition metal element $M^1$, and the density of the positive electrode mixture layer is at least 3.8 g/cm$^3$.

The "average particle size" of the lithium-containing transition metal oxides used herein means a 50% diameter value ($d_{50}$), that is, an median diameter, read from an integral fraction curve based on volumes, which is obtained by integrating the volumes of the particles from a smaller particle size measured by a MICROTRAC particle size analyzer (HRA 9320 available from NIKKISO Co., Ltd.).

The present invention also provides a method of using a nonaqueous secondary battery according to the present invention comprising the step of charging the battery so that a positive electrode voltage is in a range of 4.35 to 4.6 V with reference to the potential of lithium when the battery is fully charged.

For example, in the method of using the nonaqueous secondary battery according to the present invention, when the nonaqueous secondary battery of the present invention comprises a graphite negative electrode, namely, a negative electrode containing graphite as a negative electrode active material, which has a voltage of 0.1 V with reference to the lithium potential when the battery is fully charged, charging the battery up to a battery voltage of 4.45 V or higher is regarded as charging the battery so as to substantially attain a positive electrode voltage of 4.35 V or higher.

In the method of using the nonaqueous secondary battery according to the present invention, the term "fully charging (charged)" means charging under the following conditions: the battery is charged at a constant current of 0.2 C up to a predetermined voltage and subsequently the battery is charged at a predetermined constant voltage, provided that the total time of the constant current charging and the constant voltage charging is set to 8 hours.

Accordingly, the nonaqueous secondary battery of the present invention has a high voltage, a high capacity and high reliability including high safety.

According to the using method of the present invention, the nonaqueous secondary battery of the present invention can be used in applications which require larger power output.

BRIEF DESCRIPTION OF THE DRAWINGS

FIG. 1A is a plan view thereof and FIG. 1B is a partial vertical section thereof.

DETAILED DESCRIPTION OF THE INVENTION

Figure 1A:
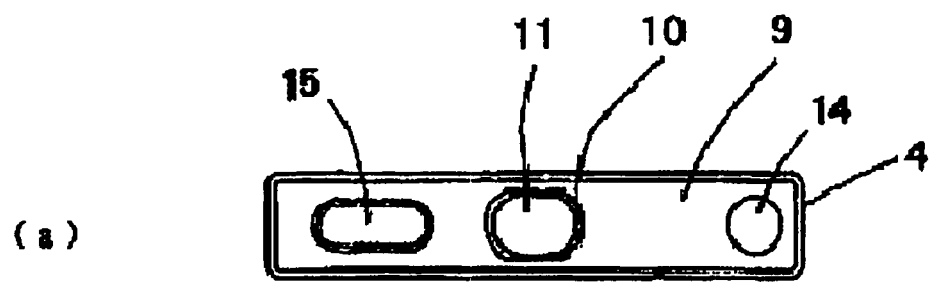
FIGS. 1A and 1B schematically show one example of the nonaqueous secondary battery of the present invention.

The positive electrode used in the nonaqueous secondary battery of the present invention comprises, as the active material, the mixture of at least three lithium-containing transition metal oxides having different average particle sizes, each of which comprises at least one transition metal selected from the group consisting of Co, Ni and Mn as a transition metal element $M^1$. Therefore, gaps between the particles of one lithium-containing transition metal oxide having relatively large particle size are filled with the particles of other transition metal oxide having a smaller particle size than the one transition metal oxide in the positive electrode mixture layer. The gaps remaining unfilled even in this manner can be filled with the lithium-containing transition metal oxide having an even smaller particle size. Accordingly, the density of the positive electrode mixture layer is increased and, in turn, the capacity of the battery is increased.

The mixture of "at least three lithium-containing transition metal oxides having different average particle sizes" has five or more inflection points in a particle size distribution curve of the mixture. The particle size distribution curve may have three or more peaks or a shoulder in one or more peaks. In the case of such a particle size distribution curve, firstly, a conventional peak-separating method is applied to separate a distribution of particles having a larger particle size and that of particles having a smaller particle size. Subsequently, from the particle sizes and the integrated volume, the average particle size ($d_{50}$) of each of the lithium-containing transition metal oxides and the mixing ratio between them can be calculated.

In the case of using, for example, three transition metal oxides having different average particle sizes as the lithium-containing transition metal oxides in the positive electrode, the average particle size of the lithium-containing transition metal oxide having the largest average particle size (hereinafter referred to as "positive electrode active material (A)") is represented by A, that of the lithium-containing transition metal oxide having the second largest average particle size (hereinafter referred to as "positive electrode active material (B)") is expressed by B, and that of the lithium-containing transition metal oxide having the smallest average particle size (hereinafter referred to as the "positive electrode active material (C)") is expressed by C. Then, the ratio of B to A (i.e., B/A) is preferably from 0.2 to 0.3, and the ratio of C to B (i.e., C/B) is preferably from 0.1 to 0.25. When the average particle sizes of the three positive electrode active materials (A), (B) and (C) satisfy these relationships, the density of the positive electrode mixture layer can be easily increased.

In the case of using 4 or more oxides having different average particle size as the lithium-containing transition metal oxides in the positive electrode, the average particle size of each of the lithium-containing transition metal oxides other than the positive electrode active material (A) having the largest average particle size and the positive electrode active material (C) having the smallest average particle size preferably satisfies the same relationships of the average particle size B of the positive electrode active material (B) with the average particle size A of the positive electrode active material (A) and the average particle size C of the positive electrode active material (C) as explained above.

The positive electrode active material (A) preferably has an average particle size of 5 µm or more, more preferably 8 µm or more, particularly preferably 11 µm or more. When the average particle size of the positive electrode active material (A) is too small, the density of the positive electrode mixture layer may hardly be increased. When the average particle size is too large, the battery characteristic tends to decrease. Thus, the average particle size is preferably 25 µm or less, more preferably 20 µm or less, particularly preferably 18 µm or less.

The positive electrode active material (B) preferably has an average particle size of 10 µm or less, more preferably 7 µm or less, particularly preferably 5 µm or less. When the average particle size of the positive electrode active material (B) is too large, the positive electrode active material (B) does not easily fill the gaps between the particles of the lithium-containing transition metal oxide having a relatively large particle size in the positive electrode mixture layer, so that the density of this layer may hardly be increased. When the average particle size is too small, the number of voids increases so that the density of the positive electrode mixture layer may not be increased. Thus, the average particle size of the positive electrode active material (B) is preferably 2 µm or more, more preferably 3 µm or more, particularly preferably 4 µm or more.

The positive electrode active material (C) preferably has an average particle size of 4 µm or less, more preferably 3 µm or less, particularly preferably 2 μm or less. When the average particle size of the positive electrode active material (C) is too large, the positive electrode active material (C) does not fill the gaps between the particles of the positive electrode active material (A) and/or the positive electrode active material (B) in the positive electrode mixture layer, so that the density of this layer may hardly be increased. When the average particle size of the positive electrode active material (C) is too small, the safety of the battery may be adversely affected. Thus, the average particle size of the positive electrode active material (C) is preferably 0.5 μm or more, more preferably 0.8 μm or more, particularly preferably 1 μm or more.

The positive electrode active materials according to the present invention may contain three lithium-containing transition metal oxides having different average particle sizes, for example, the positive electrode active materials (A), (B) and (C) as descried above, while the positive electrode active materials may contain four or more, for example, four, five or six lithium-containing transition metal oxides having different average particle sizes, as described above.

The content of the positive electrode active material (C) having the smallest average particle size in the lithium-containing transition metal oxides contained in the positive electrode is preferably 1% by weight or more, more preferably 2% by weight or more, particularly preferably 3% by weight or more. When the positive electrode active material (C) is contained in an amount of the above-mentioned range, the gaps between the particles of the lithium-containing transition metal oxide having a relatively large particle size, for example, the positive electrode active materials (A) and (B), are easily filled therewith so that the density of the positive electrode mixture layer is increased. When the content of the positive electrode active material (C) is too large, the density of the positive electrode mixture layer is hardly be increased. Thus, the content of the positive electrode active material (C) is preferably 10% by weight or less, more preferably 7% by weight or less, particularly preferably 5% by weight or less.

When the lithium-containing transition metal oxides contained in the positive electrode are only three oxides having different average particle sizes, for example, only the positive electrode active materials (A), (B) and (C), the content of the positive electrode active material (B) having a medium average particle size is preferably 8% by weight or more, more preferably 11% by weight or more, particularly preferably 13% by weight or more of the oxides. When the positive electrode active material (B) is contained in an amount in this range, the gaps between the particles of the lithium-containing transition metal oxide having a relatively large average particle size such as the positive electrode active material (A) are easily filled therewith so that the density of the positive electrode mixture layer is increased. When the content of the positive electrode active material (B) is too large, the density of the positive electrode mixture layer is hardly increased. Thus, the content of the positive electrode active material (B) is preferably 25% by weight or less, more preferably 22% by weight or less, particularly preferably 20% by weight or less.

Accordingly, when the lithium-containing transition metal oxides contained in the positive electrode are only the positive electrode active materials (A), (B) and (C), for example, the content of the positive electrode active material (A) in all the lithium-containing transition metal oxides is preferably 65% by weight or more, more preferably 67% by weight or more, particularly preferably 72% by weight or more. On the other hand, the content is preferably 90% by weight or less, more preferably 85% by weight or less, particularly preferably 80% by weight or less.

Among the lithium-containing transition metal oxides contained in the positive electrode, the positive electrode active material (C) having the smallest average particle size has the above-mentioned average particle size. Such a lithium-containing transition metal oxide having a relatively small particle size has low stability, for example, in a state that the battery is charged at a high voltage, so that the oxide may damage the reliability including the safety of the battery.

Thus, the present invention uses, as at least the positive electrode active material (C), which is the lithium-containing transition metal oxide having the smallest average particle size, a lithium-containing transition metal oxide the transition metal element $M^1$ of which is partially substituted with a metal element $M^2$ other than the element $M^1$. Since the lithium-containing transition metal oxide the transition metal element $M^1$ of which is partially substituted with the other metal element $M^2$ has the improved stability, in particular, the stability in a state that the battery is charged at a high voltage. Accordingly, the reliability including the safety of the battery can be improved. Furthermore, because of the improved stability of the lithium-containing transition metal oxide the transition metal element $M^1$ of which is partially substituted with the other metal element $M^2$, the decay of the active material (C) is suppressed, when the charge-discharge cycles are repeated. Thus, the use of such a positive electrode active material (C) increases the charge-discharge cycle characteristics of the battery.

The following method can confirm whether the transition metal element $M^1$ of at least the lithium-containing transition metal oxide having the smallest average particle size is partially substituted with the other metal element $M^2$: The particle size distribution curve of the positive electrode active material to be used in the positive electrode is obtained; peaks appearing in the curve are subjected to the above-described peak separation; and the particles belonging to the peak of the particles having the smallest particle size are analyzed with an electron probe micro-analyzer (EPMA) or the like to confirm whether they contain the metal element $M^2$.

In the present invention, it is sufficient that the positive electrode active material (C) having the smallest average particle size is a lithium-containing transition metal oxide the transition metal element $M^1$ of which is partially substituted with the other metal element $M^2$. In addition, it is preferable that at least one of the lithium-containing transition metal oxides other than the positive electrode active material (C), for example, the positive electrode active material (A) having the largest average particle size and/or the positive electrode active material (B) having an average particle size between those of the positive electrode active materials (A) and (C) may also be a lithium-containing transition metal oxide the transition metal element $M^1$ of which is partially substituted with the other metal element $M^2$. In such a case, the stability, in particular, the stability in a state that the battery is charged at a high voltage, of the oxides other than the material (C) is improved, so that the charge-discharge cycle characteristic of the battery, and the reliability including the safety thereof can be further improved.

In the positive electrode active material (C), and the other lithium-containing transition metal oxides such as the positive electrode active material (A) having the largest average particle size, and the positive electrode active material (B) having an average particle size between those of the positive electrode active materials (A) and (C), the metal element $M^2$ which substitutes a part of the transition metal element $M^1$ is preferably at least one metal element selected from the group consisting of Mg, Ti, Zr, Ge, Nb, Al and Sn, since these elements have a very high effect of improving the stability of lithium-containing transition metal oxides.

The positive electrode active material (C) is preferably a lithium-containing transition metal oxide represented by the following formula (1):

$$Li_x M^1_y M^2_z M^3_v O_2 \qquad (1)$$

wherein $M^1$ represents at least one transition metal element selected from Co, Ni and Mn, $M^2$ represents at least one metal element selected from the group consisting of Mg, Ti, Zr, Ge, Nb, Al and Sn, $M^3$ represents an element other than Liu, $M^1$ and $M^2$, and x, y, z and v are numbers satisfying the following equations respectively: $0.97 \leq x < 1.02$, $0.8 \leq y < 1.02$, $0.002 \leq z \leq 0.05$, and $0 \leq v \leq 0.05$.

Each of the lithium-containing transition metal oxides other than the positive electrode active material (C) such as the positive electrode active material (A) or (B) is preferably a lithium-containing transition metal oxide represented by the following formula (2):

$$Li_a M^1_b M^2_c M^3_d O_2 \qquad (2)$$

wherein $M^1$, $M^2$ and $M^3$ are the same as defined in the formula (1), and a, b, c and d are numbers satisfying the following equations respectively: $0.97 \leq a < 1.02$, $0.8 \leq b < 1.02$, $0 \leq c \leq 0.02$, and $0 \leq d \leq 0.02$.

$M^1$, $M^2$ and $M^3$ are selected from the same elements as in the formula (1), but the elements selected or the constituting element ratios selected in the individual positive electrode active materials having different average particle sizes may differ from each other. For example, in the positive electrode active material (B), Mg, Ti and Al may be selected, while in the positive electrode active material (A), Mg and Ti may be selected. As explained in this example, however, among the elements $M^2$, preferably at least one common element is selected, more preferably at least two common elements are selected, and particularly preferably at least three common elements are selected.

In the case of the positive electrode active material (A), "c" is preferably 0.0002 or more, more preferably 0.001 or more, and it is preferably less than 0.005, more preferably less than 0.0025, and "d" is preferably 0.0002 or more, more preferably 0.001 or more and it is preferably less than 0.005, more preferably less than 0.0025 for the following reason: the particle size of the positive electrode active material (A) is relatively large; thus, when the amount of $M^2$ and the like added to the material (A) is relatively small, advantageous effects can be attained; but, when the amount is too small, the effects to improve the charge-discharge cycle characteristic or the safety of the battery may be insufficient, while when the amount is too large, the electrical characteristics of the battery tends to decrease.

In each of the lithium-containing transition metal oxides used in the present invention, the transition metal element(s) thereof is/are preferably mainly Co and/or Ni. For example, the total amount of Co and Ni is preferably 50% by mole or more based on all the transition metal elements contained in the lithium-containing transition metal oxides.

Preferably, the proportion of Co in the lithium-containing transition metal oxide is higher, since the density of the positive electrode mixture layer can be made higher. In the formulae (1) and (2), the proportion of Co in the transition metal element $M^1$ is preferably 30% by mole or more, more preferably 65% by mole or more, particularly preferably 95% by mole or more.

The values of x in the formula (1) and a in the formula (2) may vary as the battery is charged or discharged. Nevertheless, when the battery is an as-produced one, x and a are each preferably 0.97, more preferably 0.98 or more, particularly preferably 0.99 or more, while x and a are each preferably less than 1.02, more preferably 1.01 or less, particularly preferably 1.00 or less.

The values of y in the formula (1) and b in the formula (2) are each preferably 0.98 or more, more preferably 0.98 or more, particularly preferably 0.99 or more, and they are each preferably less than 1.02, more preferably less than 1.01, particularly preferably less than 1.0.

Each of the positive electrode active material (C) represented by the formula (1), and the lithium-containing transition metal oxides other than the positive electrode active material (C) which are represented by the formula (2) preferably contains Mg as the element $M^2$, since the safety of the battery is more effectively improved. From the viewpoint of increasing the effect attained by the use of Mg as the element $M^2$, the content Mg is preferably 0.1% by mole or more, more preferably 0.15% by mole or more, particularly preferably 0.2% by mole or more by mole or more based on the content of whole $M^1$.

When the content of Mg in the positive electrode active material (C) or the other lithium-containing transition metal oxides is too large, the load characteristic of the battery tends to decrease. Accordingly, the content of Mg is preferably less than 2% by mole, more preferably less than 1% by mole, particularly preferably less than 0.5% by mole based on the content of $M^1$.

Each of the positive electrode active material (C) and the other lithium-containing transition metal oxides preferably contains, as $M^2$, at least one metal element selected from Mg, Ti, Zr, Ge, Nb, Al and Sn, in particular, Mg. More preferably, each of them contains Mg and also at least one metal element selected from Ti, Zr, Ge and Nb. Most preferably, each of them further contains Al and/or Sn as the element $M^2$. In these cases, the stability of those lithium-containing transition metal oxides is further improved in a state that the battery is charged at a high voltage. When each of them contains, as the element $M^2$, at least one metal element selected from Ti, Zr, Ge and Nb, the total content of Ti, Zr, Ge and Nb is preferably 0.05% by mole or more, more preferably 0.08% by mole or more, particularly preferably 0.1% by mole based on the content of $M^1$. When each of them contains Al and/or Sn as the element $M^2$, the total content of Al and Sn is preferably 0.1% by mole or more, more preferably 0.15% by mole or more, particularly preferably 0.2% by mole or more by mole or more based on the content of $M^1$.

When the content of Ti, Zr, Ge, Nb, Al and/or Sn is too large in the lithium-containing transition metal oxide as the positive electrode active material (C), the load characteristic of the battery tends to decrease. Thus, when the oxide contains, as the element $M^2$, at least one element selected from Ti, Zr, Ge and Nb, the total content of Ti, Zr, Ge and Nb is preferably less than 0.5% by mole, more preferably less than 0.25% by mole, particularly preferably less than 0.15% by mole based on the content of $M^1$. When the oxide contains Al and/or Sn as the element $M^2$, the total amount of Al and/or Sn is preferably less than 1% by mole, more preferably less than 0.5% by mole, particularly preferably less than 0.3% by mole based on the content of $M^1$.

A method for including the metal element $M^2$ in the positive electrode active material (C) or the other lithium-containing transition metal oxides is not particularly limited. For example, the element $M^2$ may be present on the particles of the metal oxide, may be evenly present as a solid solution inside the metal oxides, or may be unevenly present inside the metal oxides with having a density distribution. Furthermore, the element $M^2$ may form a compound which in turn forms a layer on the particle surfaces. Preferably, the element $M^2$ is evenly present as a solid solution.

In the formulae (1) and (2) representing the positive electrode active material (C) and the other lithium-containing transition metal oxides, respectively, the element $M^3$ is an element other than Li, $M^1$ and $M^2$. The positive electrode active material (C) and the other lithium-containing transition metal oxides may each contain the $M^3$ in an amount such that the advantageous effects of the present invention are not impaired, or they may contain no $M^3$.

Examples of the element $M^3$ include alkali metals other than Li (e.g., Na, K and Rb), alkaline earth metals other than Mg (e.g., Be, Ca, Sr and Ba), Group IIIa metals (e.g., Sc, Y, La), Group IVa metals other than Ti and Zr (e.g., Hf), Group Va metals other than Nb (e.g., V and Ta), Group VIa metals (e.g., Cr, Mo and W), Group VIIb metals other than Mn (e.g., Tc and Re), Group VIII metals other than Co and Ni (e.g., Fe, Ru, and Rh), Group Ib metals (e.g., Cu, Ag and Au), Group IIIb metals other than Zn and Al (e.g., B, Ga and In), Group IVb metals other than Sn and Pb (e.g., Si), P and Bi.

The metal element $M^2$ contributes to an improvement in the stability of the lithium-containing transition metal oxides. However, when the content thereof is too large, a function of storing and releasing Li ions is impaired so that the battery characteristics may be decreased. Since the positive electrode active material (C) having the smallest average particle size has the particularly small particle size and decreased stability, it is preferable that the content of the element $M^2$, which is a stabilizing element, is somewhat high. In addition, since the positive electrode active material (C) has the small particle size and in turn the large surface area, it exhibits a high activity. Thus, the presence of the element $M^2$ in the material (C) has less influence on the function of storing and releasing Li ions.

In contrast, the lithium-containing transition metal oxides having relatively large particle sizes, that is, the lithium-containing transition metal oxides other than the positive electrode active material (C), have better stability than the positive electrode active material (C). Therefore, the former metal oxides have less necessity to contain the element $M^2$ than the positive electrode active material (C). Furthermore, their function of storing and releasing Li ions is easily impaired by the presence of the element $M^2$ since the materials have the smaller surface area and the lower activity than the positive electrode active material (C).

Accordingly, it is preferable that the content of the metal element $M^2$ in the positive electrode active material (C) is larger than that in the lithium-containing transition metal oxides other than the positive electrode active material (C).

When the three lithium-containing transition metal oxides having the different average particle sizes are contained in the positive electrode, there is no especial limitation on the relationship of the element $M^2$ content between the positive electrode active material (A) having the largest average particle size and the positive electrode active material (B) having the second largest average particle size. Thus, the former may contain a larger amount of the element $M^2$ than the latter, and vise versa, or the element $M^2$ contents in the former and the latter may be the same. Alternatively, neither the positive electrode active material (A) nor the positive electrode active material (B) contain the element $M^2$. In a more preferable embodiment, a metal oxide having a smaller average particle size contains a larger amount of the element $M^2$. In particular, when the three lithium-containing transition metal oxides having different average particle sizes are used, the element $M^2$ content in the positive electrode active material (C) having the smallest average particle size is largest, that in the positive electrode active material (B) having the second smallest average particle size is second largest, and that in the positive electrode active material (A) having the largest average particle size is smallest. In this case, the positive electrode active material (A) may contain no element $M^2$.

In other words, when "c" in the formula (2) representing the positive electrode active material (B) is represented by "$c^1$", and "c" in the formula (2) representing the positive electrode active material (A) is represented by "$c^2$", "z" in the formula (1), "$c^1$" and "$c^2$" preferably satisfy the following relationship: $z > c^1 > c^2$ wherein $c^2$ may be zero.

When the positive electrode active materials (B) and (C) both contain the element $M^2$, z is preferably 1.1 times as large as $c^1$. When the positive electrode active material (A) contains the element $M^2$, $c^1$ is more preferably at least 2 times as large as $c^2$, particularly preferably at least 2.5 times as large as $c^2$, particularly preferably at least 3 times as large as $c^2$.

From the viewpoint of suppressing the decrease of load characteristic of the battery, z is preferably less than 4 times as large as $c^1$, more preferably less than 3 times as large as $c^1$, particularly preferably less than 2 times as large as $c^1$. When the positive electrode active material (A) contains $M^2$, $c^1$ is preferably less than 5 times as large as $c^2$ more preferably less than 4 times as large as $c^2$, particularly preferably less than 3.5 times as large as $c^2$.

When the four or more lithium-containing transition metal oxides having the different average particle sizes are contained in the positive electrode, with regard to the lithium-containing transition metal oxides other than the positive electrode active material (C) having the smallest average particle size, no specific limitation is put on the relationship of the element $M^2$ content between the positive electrode active material (A) having the largest average particle size and the lithium-containing transition metal oxides other than the material (A). Thus, the element $M^2$ contents may be the same between a part or all of the lithium-containing transition metal oxides. The element $M^2$ contents in the individual metal oxides may differ from each other. In a more preferable embodiment, a metal oxide having a smaller average particle size contains a larger amount of the element $M^2$.

In the lithium-containing transition metal oxides which constitute the positive electrode active material according to the present invention, the oxides having different average particle sizes may have the same composition of elements, or different compositions of elements between them. When the lithium-containing transition metal oxides according to the present invention are the above-mentioned positive electrode active materials (A), (B) and (C), the following combination may be used: a combination of the positive electrode active material (A) consisting of $LiCo_{0.9975}Mg_{0.001}Ti_{0.0005}Al_{0.001}O_2$, the positive electrode active material (B) consisting of $LiCo_{0.3965}Ni_{0.30}Mn_{0.30}Mg_{0.0012}Ti_{0.0008}Al_{0.0015}O_2$, and the positive electrode active material (C) consisting of $LiCo_{0.1955}Ni_{0.8}Mg_{0.0015}Ti_{0.001}Al_{0.002}O_2$.

The positive electrode active material comprising the lithium-containing transition metal oxides according to the present invention is formed through a certain synthesizing process and a certain battery producing process. For example, for the preparation of lithium-containing transition metal oxides which contain Co as the transition metal element $M^1$ and have different average particle sizes, firstly, a solution of an alkali such as NaOH is dropwise added to an acidic aqueous solution containing Co to precipitate $Co(OH)_2$. In order to homogeneously precipitate $Co(OH)_2$, Co may be coprecipitated with a different element, and then the coprecipitated material is calcined to obtain $Co_3O_4$. The particle size of the precipitates can be adjusted by controlling the period for forming the precipitates. The particle size of $Co_3O_4$ after calcination is also controlled by the particle size of the precipitate at this time.

When the positive electrode active material is synthesized, conditions such as a mixing condition, calcination temperature, calcination atmosphere, calcination time, starting materials, and also battery fabrication conditions are suitably selected. With regard to the mixing condition in the synthesis of the positive electrode active material, preferably, for example, ethanol or water is added to the powdery starting materials, and then mixed in a planetary ball mill for 0.5 hour or longer. More preferably, ethanol and water are mixed at a volume ratio of 50:50, and the mixture is agitated in a planetary ball mill for 20 hours or longer. Through this mixing step, the powdery starting materials are sufficiently comminuted and mixed to prepare a homogeneous dispersion. The dispersion is dried with a spray drier or the like while keeping homogeneity. The calcination temperature is preferably from 750 to 1,050° C., more preferably from 950 to 1,030° C. The calcination atmosphere is preferably an air. The calcination time is preferably from 10 to 60 hours, more preferably from 20 to 40 hours.

In the preparation of the positive electrode active material, $Li_2CO_3$ is preferably used as a lithium source. As the sources of other metal such as Mg, Ti, Ge, Zr, Nb, Al and Sn, preferred are nitrates or hydroxides of these metals, or oxides thereof having a particle size of 1 μm or less. It is preferable to use the coprecipitate of the hydroxides since the different elements are uniformly distributed in the active material.

The positive electrode used in the present invention is formed by, for example, a method described below. Firstly, the three or more lithium-containing transition metal oxides having different average particle sizes, for example, the positive electrode active materials (A), (B) and (C), are mixed with each other at a predetermined weight ratio. If necessary, an electric conductive aid (e.g., graphite, carbon black, acetylene black, etc.) is added to the mixture. Furthermore, to the mixture, a binder (e.g., polyvinylidene fluoride, poly tetrafluoroethylene, etc.) is added to prepare a positive electrode mixture. A solvent is used to formulate this positive electrode mixture in the form of a paste. The binder may be mixed with the positive electrode active material and the like after the binder is dissolved in a solvent. In this way, the paste containing the positive electrode mixture is prepared. The resultant paste is applied to a positive electrode current collector made of an aluminum foil or the like, and then dried to form a positive electrode mixture layer. If necessary, the layer is pressed to obtain a positive electrode. However, the method for producing the positive electrode is not limited to the above-mentioned method, and may be any other method.

The positive electrode mixture layer according to the present invention may have a density of 3.8 $g/cm^3$ or more, more preferably 3.85 $g/cm^3$ or more, particularly preferably 3.95 $g/cm^3$ or more. With such a density, the capacity of the battery can be increased. However, when the density of the positive electrode mixture layer is too high, the wettability with the nonaqueous electrolyte, which will be explained later, decreases. Thus, the density is preferably 4.6 $g/cm^3$ or less, more preferably 4.4 $g/cm^3$ or less, particularly preferably 4.2 $g/cm^3$ or less.

Herein, the density of the positive electrode mixture layer may be obtained by the following measuring method: The positive electrode is cut to form a sample piece having a predetermined area, the sample piece is weighed with an electronic balance having a minimum scale of 1 mg, and then the weight of the current collector is subtracted from the weight of the sample piece to calculate the weight of the positive electrode mixture layer. The total thickness of the positive electrode is measured at ten points with a micrometer having a minimum scale of 1 μm. Then, the thickness of the current collector is subtracted from the resultant individual thicknesses, and the thicknesses of the positive electrode mixture layer measured at ten points are averaged. From the averaged thicknesses of the positive electrode mixture layer and the surface area, the volume of the positive electrode mixture layer is calculated. Finally, the weight of the positive electrode mixture layer is divided by the volume thereof to obtain the density of the positive electrode mixture layer.

The thickness of the positive electrode mixture layer is preferably from 30 to 200 μm, and the thickness of the current collector used in the positive electrode is preferably from 8 to 20 μm.

In the positive electrode mixture layer, the content of the lithium-containing transition metal oxides as the active materials is preferably 96% by weight or more, more preferably 97% by weight or more, particularly preferably 97.5% by weight or more, while it is preferably 99% by weight or less, more preferably 98% by weight or less. The content of the binder in the positive electrode mixture layer is preferably 1% by weight or more, more preferably 1.3% by weight or more, particularly preferably 1.5% by weight or more, while it is preferably 4% by weight or less, more preferably 3% by weight or less, particularly preferably 2% by weight or less. The content of the electric conductive aid in the positive electrode mixture layer is preferably 1% by weight or more, more preferably 1.1% by weight or more, particularly preferably 1.2% by weight or more, while it is preferably 3% by weight or less, more preferably 2% by weight or less, particularly preferably 1.5% by weight or less.

When the content of the active material in the positive electrode mixture layer is too small, the capacity cannot be increased and also the density of the positive electrode mixture layer cannot be increased. When this content is too large, the resistance may increase or the formability of the positive electrode may be impaired. When the binder content in the positive electrode mixture layer is too large, the capacity may hardly be increased. When this content is too small, the adhesion of the layer to the current collector decreases so that the powder may drop off from the electrode. Thus, the above-mentioned preferable ranges are desirable. Furthermore, when the content of the electric conductive aid in the positive electrode mixture layer is too large, the density of the positive electrode mixture layer may not be made sufficiently high so that the capacity may hardly be increased. When this content is too small, the sufficient electric conduction through the positive electrode mixture layer is not attained so that the charge-discharge cycle characteristic or the load characteristic of the battery may deteriorated.

It is essential for the nonaqueous secondary battery of the present invention to have the positive electrode explained above, and thus there is no specific limitation on other elements or structure of the battery. The battery of the present invention may adopt various elements and structures, which are commonly adopted in the conventional nonaqueous secondary batteries in the state of art.

The negative electrode active material in the negative electrode may be any material that can be doped and de-doped with Li ions. Examples thereof are carbonaceous materials such as graphite, pyrolytic carbons, cokes, glassy carbons, burned bodies of organic polymers, mesocarbon microbeads, carbon fibers and activated carbon. In addition, the following materials can also be used as the negative electrode active material: alloys of Si, Sn, In or the like, oxides of Si, Sn or the like that can be charged and discharged at a low voltage near a voltage at which Li can be charged and discharged, and nitrides of Li and Co such as $Li_{2.6}Co_{0.4}N$. Graphite can be partially substituted with a metal, a metal oxide or the like that can be alloyed with Li. When graphite is used as the negative electrode active material, the voltage when the battery is fully charged can be regarded as about 0.1 V with reference to the potential of lithium, and therefore the voltage of the positive electrode can be conveniently calculated as a voltage obtained by adding 0.1 V to the battery voltage. Consequently, the charge voltage of the positive electrode is easily controlled.

Preferably, graphite has such a form in that a lattice spacing $d_{002}$ of the (002) planes is 0.338 nm or less, since the negative electrode or a negative electrode mixture layer, which will be explained later, has a higher density as the crystallinity is higher. However, when the lattice spacing $d_{002}$ is too large, the high density negative electrode may decrease the discharge characteristic or the load characteristic of the battery. Thus, the lattice spacing $d_{002}$ is preferably 0.335 nm or more, more preferably 0.3355 nm or more.

The crystal size of the graphite in the c axis direction (Lc) is preferably 70 nm or more, more preferably 80 nm or more, particularly preferably 90 nm or more. As the Lc is larger, the charging curve becomes flat so that the voltage of the positive electrode is easily controlled and also the capacity can be made large. When the Lc is too large, the battery capacity tends to decrease with the high-density negative electrode. Thus, the Lc is preferably less than 200 nm.

Furthermore, the specific surface area of the graphite is preferably 0.5 $m^2$/g or more, more preferably 1 $m^2$/g or more, particularly preferably 2 $m^2$/g or more, while it is preferably 6 $m^2$/g or less, more preferably 5 $m^2$/g or less. Unless the specific surface area of the graphite is somewhat large, the characteristics tend to decrease. When the specific surface area is too large, the graphite easily reacts with the electrolyte and such a reaction may have influences on the properties of the battery.

The graphite used in the negative electrode is preferably made of natural graphite. More preferred is a mixture of two or more graphite materials having different surface crystallinity to achieve the high density of the negative electrode. Since natural graphite is inexpensive and achieves a high capacity, the negative electrode with a high cost performance can be produced. Usually, when natural graphite is used, the battery capacity is easily decreased as the density of the negative electrode is increased. However, the decrease in the battery capacity can be suppressed by mixing the natural graphite with a graphite having a reduced surface crystallinity by a surface treatment.

The surface crystallinity of specific graphite can be determined by the Raman spectrum analysis. When the R value of the Raman spectrum ($R=I_{1350}/I_{1580}$, that is, the ratio of the Raman intensity around 1350 $cm^{-1}$ to that around 1580 $cm^{-1}$) is 0.01 or more, where the Raman spectrum is measured with graphite which has been excited with an argon laser having a wavelength of 514.5 nm, the surface crystallinity of the specific graphite is slightly lower than that of natural graphite. Thus, with the graphite having a surface crystallinity decreased by the surface treatment, the R value is preferably 0.01 or more, more preferably 0.1 or more, while it is preferably 0.5 or less, more preferably 0.3 or less. The content of the graphite having a surface crystallinity decreased by surface treatment is preferably 100% by weight of the whole graphite in order to increase the density of the negative electrode. However, in order to prevent the decrease of the battery capacity, the content of such graphite is preferably 50% by weight or more, more preferably 70% by weight or more, particularly preferably 85% by weight or more of the whole graphite.

When the average particle size of the graphite is too small, an irreversible capacity increases. Thus, the average particle size of the graphite is preferably 5 μm or more, more preferably 12 μm or more, particularly preferably 18 μm or more. From the viewpoint of the increase of the capacity of the negative electrode, the average particle size of the graphite is 30 μm or less, more preferably 25 μm or less, particularly preferably 20 μm or less.

The negative electrode may be produced by the following method, for example: The negative electrode active material and an optional a binder and/or other additives are mixed to prepare a negative electrode mixture, and the mixture is dispersed in a solvent to prepare a paste. Preferably, the binder is dissolved in a solvent prior to mixing with the negative electrode active material, and then mixed with the negative electrode active material and so on. The paste containing the negative electrode mixture is applied to a negative electrode current collector made of a copper foil or the like, and then dried to form a negative electrode mixture layer. The layer is pressed to obtain a negative electrode. However, the method for producing the negative electrode is not limited to the above-mentioned method, and may be any other method.

The density of the negative electrode mixture layer after pressing is preferably 1.70 $g/cm^3$ or more, more preferably 1.75 $g/cm^3$ or more. Based on the theoretical density of graphite, the upper limit of the density of the negative electrode mixture layer formed using graphite is 2.1 to 2.2 $g/cm^3$. The density of the negative electrode mixture layer is preferably 2.0 $g/cm^3$ or less, more preferably 1.9 $g/cm^3$ or less from the viewpoint of the affinity with the nonaqueous electrolyte. It is preferable to press the negative electrode plural times since the negative electrode can be uniformly pressed.

The binder used in the negative electrode is not particularly limited. For the increase of the content of the active material to increase the capacity, the amount of the binder is preferably made as small as possible. To this end, the binder is preferably a mixture of an aqueous resin which can be dissolved or dispersed, and a rubbery polymer, since the use of only a small amount of the aqueous resin can contribute to the dispersion of the graphite and thus prevents the delamination of the negative electrode mixture layer from the current collector caused by the expansion and contraction of the electrode in the charge-discharge cycles.

Examples of the aqueous resins include cellulose resins such as carboxymethylcellulose, and hydroxypropylcellulose, and polyvinylpyrrolidone, polyepichlorohydrin, polyvinylpyridine, polyvinyl alcohol, polyether resins such as polyethylene oxide and polyethylene glycol, etc. Examples of the rubbery polymers include latex, butyl rubber, fluororubber, styrene-butadiene rubber, nitrile-butadiene copolymer rubber, ethylene-propylene-diene copolymer (EPDM), polybutadiene, etc. From the viewpoint of the dispersibility of the graphite particles and the prevention of delamination of the layer, it is preferable to use a cellulose ether compound such as carboxymethylcellulose together with a butadiene copolymer rubber such as a styrene-butadiene rubber. It is particularly preferable to use carboxymethylcellulose together with a butadiene copolymer rubber such as a styrene-butadiene copolymer rubber or a nitrile-butadiene-copolymer rubber. The cellulose ether compound such as carboxymethylcellulose mainly has a thickening effect on the paste containing the negative electrode mixture, while the rubbery polymer such as the styrene-butadiene copolymer rubber has a binding effect on the negative electrode mixture. When the cellulose ether compound such as carboxymethylcellulose and the rubbery polymer such as the styrene-butadiene copolymer rubber are used in combination, the weight of the former to the latter is preferably from 1:1 to 1:15.

The thickness of the negative electrode mixture layer is preferably from 40 to 200 μm. The thickness of the current collector used in the negative electrode is preferably from 5 to 30 μm.

In the negative electrode mixture layer, the content of the binder or binders is preferably 1.5% by weight or more, more preferably 1.8% by weight or more, particularly preferably 2.0% by weight or more of the layer, while it is preferably less than 5% by weight, less than 3% by weight, less than 2.5% by weight. When the amount of the binder in the negative electrode mixture layer is too large, the discharge capacity of the battery may decrease. When the amount is too small, the adhesion between the particles decreases. The content of the negative electrode active material in the negative electrode mixture layer is preferably more than 95% by weight and 98.5% by weight or less.

In the nonaqueous secondary battery of the present invention, the nonaqueous electrolyte is preferably a nonaqueous solvent-base electrolytic solution comprising an electrolyte salt such as a lithium salt dissolved in a nonaqueous solvent such as an organic solvent, from the viewpoint of electric characteristics or handling easiness. A polymer electrolyte or a gel electrolyte may be used without any problem.

The solvent in the nonaqueous electrolytic solution is not particularly limited, and examples thereof include acyclic esters such as dimethyl carbonate, diethyl carbonate, ethylmethyl carbonate, and methyl propyl carbonate; cyclic esters having a high dielectric constant, such as ethylene carbonate, propylene carbonate, butylene carbonate, and vinylene carbonate; and mixed solvents comprising an acyclic ester and a cyclic ester. Mixed solvents each comprising an acyclic ester as a main solvent and a cyclic ester are particularly suitable.

Apart form the esters exemplified above, the following solvents may also be used: acyclic phosphoric acid triesters such as trimethyl phosphate; ethers such as 1,2-dimethoxyethane, 1,3-dioxolane, tetrahydrofuran, 2-methyl-tetrahydrofuran and diethyl ether; nitriles and dinitriles; isocyanates; and halogen-containing solvents. Furthermore, amine or imide organic solvents, or sulfur-containing organic solvents such as sulfolane may be used.

Furthermore, the nonaqueous electrolytic solution may preferably contain a nonionic aromatic compound. Specific examples thereof include aromatic compounds having an alkyl group bonded to an aromatic ring (e.g., cyclohexylbenzene, isopropylbenzene, tert-butylbenzene, tert-amylbenzene, octylbenzene, toluene and xylene); aromatic compounds having a halogen group bonded to an aromatic ring (e.g., fluorobenzene, difluorobenzene, trifluorobenzene and chlorobenzene); aromatic compounds having an alkoxy group bonded to an aromatic ring (e.g., anisole, fluoroanisole, dimethoxybenzene and diethoxybenzene); aromatic carboxylic acid esters such as phthalic acid esters (e.g., dibutyl phthalate and di-2-ethylhexyl phthalate) and benzoic acid esters; carbonic acid esters having a phenyl group (e.g., methylphenyl carbonate, butylphenyl carbonate and diphenyl carbonate); phenyl propionate; and biphenyl. Among them, the compounds having an alkyl group bonded to an aromatic ring (alkaryl compounds) are preferred, and cyclohexylbenzene is particularly preferred.

The aromatic compounds exemplified above can form a film on the surface of the active material in the positive electrode or the negative electrode in the battery. These aromatic compounds may be used alone, while more advantageous effects can be attained by the use of two or more of the aromatic compounds together. Particularly advantageous effects can be attained on the improvement of the safety of the battery by the use of the alkaryl compound together with an aromatic compound, which can be oxidized at a lower voltage than the alkaryl compound, such as biphenyl.

The method for adding the aromatic compound in the nonaqueous electrolytic solution is not particularly limited. In general, the aromatic compound is added to the nonaqueous electrolytic solution prior to the fabrication of the battery.

The content of the aromatic compound in the nonaqueous electrolytic solution is preferably 4% by weight or more from the viewpoint of the safety, and it is preferably 10% by weight or less from the viewpoint of the load characteristic. When two or more aromatic compounds are used together, the total amount thereof is within the above-mentioned range. When the alkaryl (alkylaryl) compound and the aromatic compound which can be oxidized at a lower voltage that the alkaryl compound are used in combination, the content of the alkaryl compound in the nonaqueous electrolytic solution is preferably 0.5% by weight or more, more preferably 2% by weight or more, while it is preferably 8% by weight or less, more preferably 5% by weight or less. The content of the aromatic compound that can be oxidized at a lower voltage than the alkaryl compound in the nonaqueous electrolytic solution is preferably 0.1% by weight or more, more preferably 0.2% by weight or more, while it is preferably 1% by weight or less, more preferably 0.5% by weight or less.

Furthermore, a surface protecting coating can be formed on the surface of the positive electrode active material in the step of initial charging of the battery, when the nonaqueous electrolytic solution contains at least one compound selected from the group consisting of halogen-containing organic solvents (e.g., halogen-containing carbonates), sulfur-containing organic solvents, fluorine-containing organic lithium salts, phosphorus-containing organic solvents, silicon-containing organic solvents, nitrogen-containing organic solvents, etc. Among them, organic fluorine-containing solvents (e.g., fluorine-containing carbonates), organic sulfur-containing solvents and fluorine-containing organic lithium salts are more preferable. Specific examples thereof include F-DPC [$C_2F_5CH_2O(C=O)OCH_2C_2F_5$], F-DEC [$CF_3CH_2O(C=O)OCH_2CF_3$], HFE7100 ($C_4F_9OCH_3$), butyl sulfate ($C_4H_9OSO_2OC_4H_9$), methylethylene sulfate [(—OCH($CH_3$)$CH_2O$—)$SO_2$], butyl sulfate ($C_4H_9SO_2C_4H_9$), a polymer imide salt ([—N(Li)$SO_2OCH_2(CF_2)_4CH_2OSO_2$—]$_n$ wherein n is from 2 to 100), ($C_2F_5SO_2)_2$NLi, and [($CF_3)_2CHOSO_2]_2$NLi.

Such additives may be used alone. It is particularly preferable to use a fluorine-containing organic solvent together with a fluorine-containing organic lithium salt. The amount of such an additive added is preferably 0.1% by weight or more, more preferably 2% by weight or more, particularly preferably 5% by weight or more, while it is preferably 30% by weight or less, more preferably 10% by weight or less, each based on the whole weight of the nonaqueous electrolytic solution. When the amount of the additive is too large, the electric characteristics of the battery may deteriorate. When the amount is too small, a good coating may hardly be formed.

When the battery comprising the nonaqueous electrolytic solution containing the above-mentioned additive(s) is charged, particularly at a high voltage, a surface protecting coating that contains fluorine or sulfur atoms is formed on the positive electrode active material surface. This surface protecting coating may contain either fluorine atoms or sulfur atoms. Preferably, the coating contains both of fluorine atoms and sulfur atoms.

The amount of the sulfur atoms in the surface protecting coating formed on the positive electrode active material surface is preferably 0.5 atomic % or more, more preferably 1 atomic % or more, particularly preferably 3 atomic % or more. However, when the amount of the sulfur atoms in the positive electrode active material surface is too large, the discharge characteristic of the battery tends to decrease. Thus, the amount is preferably 20 atomic % or less, more preferably 10 atomic % or less, particularly preferably 6 atomic % or less.

The amount of the fluorine atoms in the surface protecting coating formed on the positive electrode active material surface is preferably 15 atomic % or more, more preferably 20 atomic % or more, particularly preferably 25 atomic % or more. However, when the amount of the fluorine atoms in the positive electrode active material surface is too large, the discharge characteristic of the battery tends to fall. Thus, the amount of the fluorine atoms is preferably 50 atomic % or less, more preferably 40 atomic % or less, particularly preferably 30 atomic % or less. The surface protecting coating, which contains the fluorine atoms and/or the sulfur atoms, in the positive electrode active material may not be formed by charging the battery as described above, but the positive electrode (battery) may be formed by the use of the positive electrode active material, that is, the lithium-containing transition metal oxides, which has such a surface protecting coating already formed.

In order to improve the charge-discharge cycle characteristic of the battery, preferably, the nonaqueous electrolytic solution contains at least one carbonate compound selected from the group consisting of vinylene carbonates, such as (—OCH=CHO—)C=O, (—OCH=C(CH$_3$)O—)C=O and (—OC(CH$_3$)=C(CH$_3$)O—)C=O, and derivatives thereof; and fluorine-substituted ethylene carbonates, such as (—OCH$_2$—CHFO—)C=O and (—OCHF—CHFO—)C=O. The addition amount thereof is preferably 0.1% by weight or more, more preferably 0.5% by weight or more, particularly preferably 2% by weight or more based on the whole weight of the nonaqueous electrolytic solution. When the addition amount thereof is too large, the load characteristic of the battery tends to decrease. Thus, the addition amount is preferably 10% by weight or less, more preferably 5% by weight or less, particularly preferably 3% by weight or less based on the whole weight of the nonaqueous electrolytic solution.

Examples of the electrolyte salt to be dissolved in the solvent during the preparation of the nonaqueous electrolytic solution include LiClO$_4$, LiPF$_6$, LiBF$_4$, LiAsF$_6$, LiSbF$_6$, LiCF$_3$SO$_3$, LiC$_4$F$_9$SO$_3$, LiCF$_3$CO$_2$, Li$_2$C$_2$F$_4$(SO$_3$)$_2$, LiN(RfSO$_2$)(Rf'SO$_2$), LiC(RfSO$_2$)$_3$, LiC$_n$F$_{2n+1}$SO$_3$ wherein n≧2, and LiN(RfOSO$_2$)$_2$ wherein Rf and Rf' each represent a fluoroalkyl group. They may be used alone or in combination of two or more thereof. Among these electrolyte salts, particularly preferred are fluorine-containing organic lithium salts having 2 or more carbon atoms, since such lithium salts have a large anionic property and further ion separation easily occurs so that the salts are easily dissolved in the above-mentioned solvents. The concentration of the electrolyte salt in the nonaqueous electrolytic solution is not particularly limited, and it is preferably 0.3 mol/L or more, more preferably 0.4 mol/L or more, while it is preferably 1.7 mol/L or less, more preferably 1.5 mol/L or less.

In the present invention, the nonaqueous electrolyte may be a gel-form polymer electrolyte besides the nonaqueous electrolytic solution described above. The gel-form polymer electrolyte corresponds to a product obtained by the gelation of the nonaqueous electrolytic solution with a gelling agent. For the gelation of the nonaqueous electrolytic solution, the following gelling agents may be used: a linear polymer such as polyvinylidene fluoride, polyethylene oxide or polyacrylonitrile, or a copolymer thereof; or a polyfunctional monomer which can be polymerized by irradiation with actinic rays such as ultraviolet rays or electron beams (e.g., an acrylate having 4 or more functionalities such as pentaerythritol tetraacrylate, ditrimethylolpropane tetraacrylate, ethoxylated pentaerythritol tetraacrylate, dipentaerythritol hydroxypentaacrylate, or dipentaerythritol hexaacrylate; or a methacrylate having 4 or more functionalities, which are analogous to the above acrylates. In the case of the monomer, the monomer itself does not cause the gelling of the electrolytic solution, but the polymer formed from the monomer acts as a gelling agent.

When a polyfunctional monomer is used to gel the electrolytic solution as described above, a polymerization initiator may optionally be used. Examples of the polymerization initiator include benzoyls, benzoin alkyl ethers, benzophenones, benzoylphenylphosphine oxides, acetophenones, thioxanthones and anthraquinones. As a sensitizer for the polymerization initiator, an alkylamine or an aminoester may be used.

In the present invention, the nonaqueous electrolyte may be a solid electrolyte besides the nonaqueous electrolytic solution or the gel-form polymer electrolyte. The solid electrolyte may be an inorganic solid electrolyte or an organic solid electrolyte.

In the present invention, a separator used in the present invention preferably has a thickness of 5 μm or more, more preferably 10 μm or more, particularly preferably 12 μm or more, while it is preferably less than 25 μm, more preferably less than 20 μm, particularly preferably less than 18 μm, from the viewpoint of imparting the directionality of the tensile strength to the separator, keeping good insulating properties and reducing the thermal shrinkage of the separator. The gas permeability of the separator is preferably 500 second/100-mL or less, more preferably 300 second/100-mL or less, particularly preferably 120 second/100-mL or less. As the gas permeability of the separator is smaller, the load characteristic is made better but an inside short-circuit is more easily caused. Thus, the gas permeability is preferably 50 second/100-mL or more. Here, a gas permeability is measured according to JIS P8117. As the thermal shrinkage factor of the separator in the transverse direction (TD) is smaller, an inside short-circuit is less easily caused when the temperature of the battery rises. Thus, the thermal shrinkage factor in TD of the separator is as small as possible. The thermal shrinkage factor in TD is preferably 10% or less, more preferably 5% or less. In order to restrain the thermal shrinkage of the separator, it is preferable to thermally treat the separator in advance at a temperature of about 100 to 125° C. The separator having such a thermal shrinkage factor is preferably combined with the positive electrode materials according to the present invention to fabricate a battery, since the behaviors of the battery at high temperature become stable.

The thermal shrinkage factor in TD of the separator means the shrinkage factor of a portion thereof that most largely shrinks in TD when the separator having a size of 30 mm square is allowed to stand at 105° C. for 8 hours.

With regard to the strength of the separator, a tensile strength in the machine direction (MD) is preferably $6.8 \times 10^7$ N/m$^2$ or more, more preferably $9.8 \times 10^7$ N/m or more. The tensile strength in TD is preferably smaller than that in MD. The ratio of the tensile strength in TD to that in MD (tensile strength in TD/tensile strength in MD) is preferably 0.95 or less, more preferably 0.9 or less, while it is preferably 0.1 or more. The transverse direction means a direction perpendicular to the direction in which the film resin for the production of the separator is wound up, that is, the machine direction.

The puncture strength of the separator is preferably 2.0 N or more, more preferably 2.5 N or more. As this value is higher, the battery is less easily short-circuited. Usually, however, the upper limit thereof is substantially determined by the material of the separator. In the case of a separator made of polyethylene, the upper limit of the puncture strength is about 10 N. Here, a puncture strength is measured by cutting a sample piece of 50 mm×50 mm from a separator, clamping the sample piece with jigs at the edges of 5 mm, puncturing the sample piece with a needle having a tip end with a radius of 0.5 mm at a rate of 2 mm/sec., and measuring a maximum load before the puncture of the sample piece as a puncture strength.

When a conventional nonaqueous secondary battery is charged at a high positive electrode voltage of 4.35 V or higher with reference to the potential of lithium and is discharged to a final voltage higher than 3.2 V, the crystalline structure of the positive electrode active material decays to decrease the capacity or to induce heating of the battery due to the deterioration of the thermal stability. Thus, the battery may not be practically used. When a positive electrode active material to which a different element such as Mg or Ti is added is used, the decrease of the safety or of the capacity over charge-discharge cycles can be suppressed, but the degree of suppression is not sufficient. Moreover, the filling of the positive electrode is insufficient so that the battery easily expands.

In contrast, the battery of the present invention having the structure explained above is a nonaqueous secondary battery which improves the capacity, the charge-discharge cycle characteristic, the safety and the suppression of expansion of the battery. These advantageous effects can be attained at a usual charging volt (a battery voltage of 4.2 V). Furthermore, when the positive electrode is charged up to a high voltage of 4.35 V with reference to the potential of lithium (i.e., a battery voltage of 4.25 V) and then the discharge of the battery is terminated at a high voltage, that is, a battery voltage of 3.2 V or higher, the crystalline structures of the positive electrode active materials are very stable so that the decrease of the capacity or thermal stability is prevented.

Moreover, the positive electrode active material of any conventional nonaqueous secondary battery generates a low average voltage. Therefore, when a charge-discharge cycle test is repeated under a condition that the discharge final voltage of a unit cell is 4.35 V or higher with reference to the potential of lithium, the positive electrode is doped or dedoped with a large amount of Li ions. This situation is analogous to a case where the battery is subjected to a charge-discharge cycle test under an overcharge condition. Under such a severe condition, any conventional positive electrode active material cannot maintain its crystalline structure so as to cause disadvantages such that the thermal stability declines or the charge-discharge cycle life is shortened. To the contrary, the use of the positive electrode active materials according to the battery of the present invention can overcome such disadvantages of the conventional positive electrode active material. Thus, the present invention provides a nonaqueous secondary battery which can be reversibly charged and discharged even at a high voltage, such as a voltage of 4.35 to 4.6 V with reference to the potential of lithium.

The nonaqueous secondary battery of the present invention has characteristics including a high voltage, a high capacity and a high safety. By making use of such characteristics, the nonaqueous secondary battery of the present invention can be used as a power source of a notebook personal computer, a stylus-operated personal computer, a pocket personal computer, a notebook word processor, a pocket word processor, an electronic book player, a cellular phone, a codeless handset, a pager, a portable terminal, a portable copier, an electrical notebook, an electronic calculator, a liquid crystal television set, an electric shaver, an electric power tool, an electronic translating machine, an automobile telephone, a transceiver, a voice input device, a memory card, a backup power source, a tape recorder, a radio, a headphone stereo, a handy printer, a handy cleaner, a portable CD player, a video movie, a navigation system, a refrigerator, an air conditioner, a television, a stereo, a water heater, a microwave oven, a dishwasher, a washing machine, a drying machine, a game equipment, a lighting equipment, a toy, a sensor equipment, a load conditioner, a medical machine, an automobile, an electric vehicle, a golf cart, an electrically-powered cart, a security system, a power storing system, or the like. The battery can be used not only for the consumer applications but also for aerospace applications. The capacity-increasing effect of the present invention is enhanced, in particular, in small-sized portable devices. Thus, the battery of the present invention is used in a portable device desirably having a weight of 3 kg or less, more desirably 1 kg or less. The lower limit of the weight of the portable device is not particularly limited. However, the lower limit is desirably a value equal to the weight of the battery, for example, 10 g or more in order to attain the advantageous effects to some degree.

EXAMPLES

The present invention will be described in detail with reference to the following Examples; however, the Examples do not limit the scope of the present invention. Thus, modifications of the examples are encompassed by the scope of the present invention as long as the modifications do not depart from the subject matter of the present invention, which has been described above or will be described hereinafter.

Example 1

Production of Positive Electrode

The lithium-containing positive electrode materials, $LiCo_{0.9978}Mg_{0.0008}Ti_{0.0004}Al_{0.001}O_2$ (average particle size: 18 μm) as a positive electrode active material (A), $LiCo_{0.9949}Mg_{0.0024}Ti_{0.0012}Al_{0.0015}O_2$ (average particle size: 5 μm) as a positive electrode active material (B), and $LiCo_{0.9940}Mg_{0.0027}Ti_{0.0013}Al_{0.0020}O_2$ (average particle size: 1 μm) as a positive electrode active material (C) at a weight ratio of 77:19:4 were mixed. Then, 97.3 parts by weight of the mixture and 1.5 parts by weight of a carbonaceous material as an electric conductive aid were charged in a volumetric feeder as a device for supplying powder. An amount of a 12 wt. % solution of polyvinylidene fluoride (PVDF) in N-methyl-2-pyrrolidone (NMP) to be supplied to the feeder was adjusted to control a solid content in the mixture constantly at 94% by weight during kneading. While the amount of the mixed materials supplied in a unit time was controlled to a predetermined amount, the materials were supplied in a biaxial kneading extruder and then kneaded. In this way, a paste containing the positive electrode mixture was prepared. The resultant paste was charged in a planetary mixer, and then a 12 wt. % solution of PVDF in NMP, and NMP were added to dilute the paste, thereby adjusting the viscosity of the paste at a level sufficient for application. This diluted paste containing the positive electrode active material mixture was passed through a 70-mesh net to remove large substances. Thereafter, the paste was uniformly applied to both surfaces of a positive electrode current collector made of an aluminum foil with a thickness of 15 μm, and then dried to form film-form positive electrode mixture layers. In the dried positive electrode mixture layers, the weight ratio of the positive electrode active material/the electric conduction aiding agent/PVDF was 97:1.5:1.5. Thereafter, the resultant sheet was pressed and cut out in a predetermined size. To the cut piece, a lead member made of aluminum was welded to form a sheet-form positive electrode. The density of the pressed positive electrode mixture layers (the density of the positive electrode) was 3.95 g/cm³. The thickness of the positive electrode mixture layers (the total thickness of the layers on both the surfaces, i.e., the thickness obtained by subtracting the thickness of the aluminum foil layer of the positive electrode current collector from the total thickness of the positive electrode) was 130 μm.

In the positive electrode active material (A), the amount of Mg was 0.08% by mole, that of Ti was 0.04% by mole, and that of Al was 0.1% by mole, each based on the amount of Co. An electron prove X-ray microanalyzer (EMPA 1600 manufactured by Shimadzu Corporation) was used to measure the concentration of the metal element $M^2$ in cross sections of the particles. As a result, no difference in the concentration of each of Mg, Ti and Al was observed between the surface portion and the core portion.

In the positive electrode active material (B), the amount of Mg was 0.24% by mole, that of Ti was 0.12% by mole, and that of Al was 0.15% by mole, each based on the amount of Co. The concentration of the metal element $M^2$ in the cross sections of the particles was measured in the same manner as in the case of the positive electrode active material (A). As a result, no difference in the concentration of each of Mg, Ti and Al was observed between the surface portion and the core portion.

In the positive electrode active material (C), the amount of Mg was 0.27% by mole, that of Ti was 0.13% by mole, and that of Al was 0.2% by mole, each based on the amount of Co. The concentration of the metal element $M^2$ in cross sections of the particles was measured in the same manner as in the case of the positive electrode active material (A). As a result, no difference in the concentration of each of Mg, Ti and Al was observed between the surface portion and the core portion.

The above-mentioned results show that, among the positive electrode active materials used in Example 1, the content of the metal element $M^2$ was larger as the average particle size was smaller, and the positive electrode active material (C) having the smallest average particle size contained the largest amount of the metal element $M^2$.

Production of Negative Electrode

In a planetary mixer, 180 parts by weight of a graphite type carbonaceous material (purity: 99.9% or more, average particle size: 18 μm, $d_{002}$: 0.337 nm, size of the crystallite in the c axis direction (Lc): 95.0 nm) as a negative electrode active material and 65 parts by weight of a 12 wt. % solution of PVDF in NMP were charged, and then the mixture was kneaded for 1 hour to prepare a paste containing negative electrode mixture. The resultant paste had a solid content of 60.0% by weight. Thereafter, a 12 wt. % solution of PVDF in NMP, and NMP were added to the above mixture to adjust the viscosity of the paste at a level sufficient for application. This paste containing negative electrode mixture was passed through a 70-mesh net to remove large inclusions. Thereafter, the paste was uniformly applied to both surfaces of a negative electrode current collector made of a strip-form copper foil having a thickness of 10 μm, and then dried to form negative electrode mixture layers. The resultant sheet was pressed until the density of the negative electrode mixture layers became 1.55 g/cm³. The resultant sheet was then cut out in a predetermined size. Thereafter, a lead member made of nickel was welded to the cut piece to form a sheet-form negative electrode.

Preparation of Nonaqueous Electrolytic Solution

An amount of $LiPF_6$ was dissolved in a mixed solvent of methylethyl carbonate, diethyl carbonate and ethylene carbonate mixed at a volume ratio of 1.5:0.5:1 to attain a concentration of 1.2 mol/L. To this solution, 3% by weight of fluorobenzene, 0.2% by weight of biphenyl, 0.5% by weight of propanesultone, 10% by weight of $C_4F_9OCH_3$, and 3% by weight of vinylene carbonate were added to prepare a nonaqueous electrolytic solution.

Production of Nonaqueous Secondary Battery

Figure 1B:
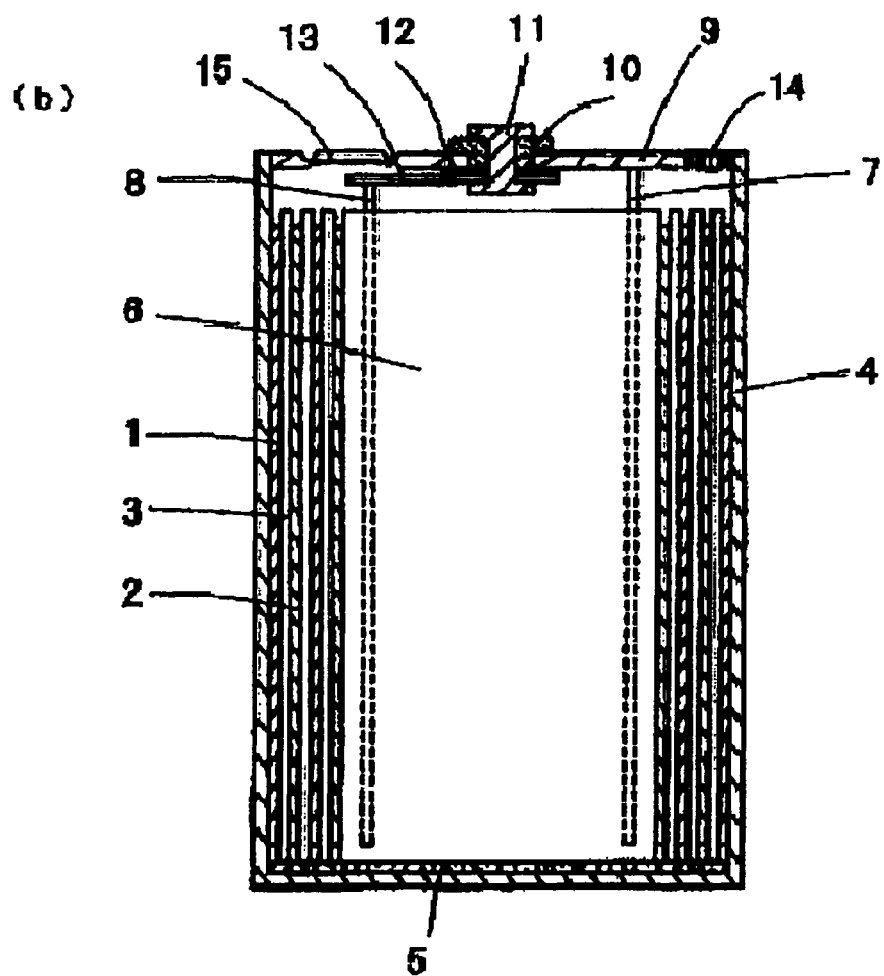
Figure 2:
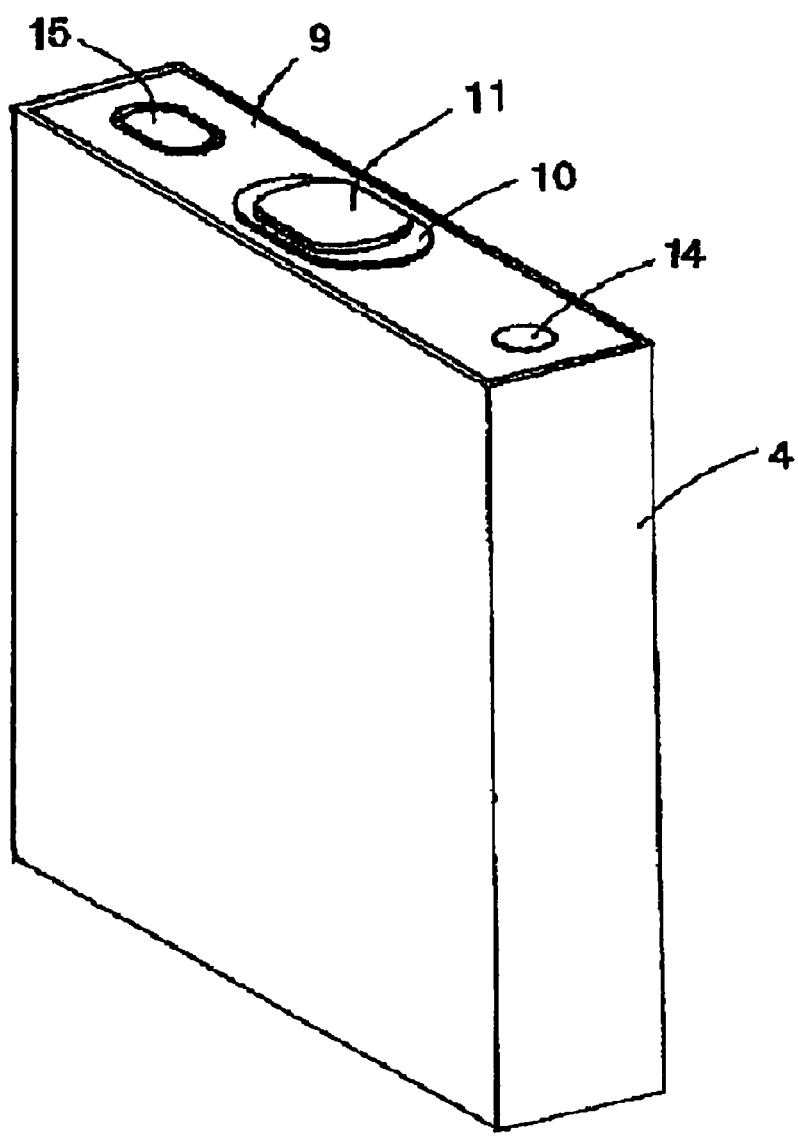
FIG. 2 shows a perspective view of the nonaqueous secondary battery illustrated in FIGS. 1A and 1B.

The positive electrode and the negative electrode were dried, and then spirally wound with interposing, therebetween, a separator made of a microporous polyethylene film (porosity: 53%, tensile strength in MD: $2.1 \times 10^8$ N/m², tensile strength in TD: $0.28 \times 10^8$ N/m², thickness: 16 μm, gas permeability: 80 seconds/100-mL, thermal shrinkage factor after being kept at 105° C. for 8 hours: 3%, puncture strength: 3.5 N (360 g)), to form an electrode body having a spiral structure. Thereafter, the electrode body was pressed to form a flat-shaped electrode body and inserted into a box-shaped battery case made of an aluminum alloy. The positive and negative lead members were welded and a cover plate was laser welded to the edge portion of an opening of the battery case. Then, the nonaqueous electrolytic solution prepared in the above was poured into the battery case through an inlet made in the cover plate. The nonaqueous electrolytic solution was sufficiently infiltrated into the separator and the like. Thereafter, the battery was partially charged, and gas generated during the partial charging was discharged. Then, the inlet was sealed up to make the battery airtight. Thereafter, the battery was charged and aged to yield a rectangular nonaqueous secondary battery having a structure as shown in FIGS. 1A and 1B and an external appearance as shown in FIG. 2, and a width of 34.0 mm, a thickness of 4.0 mm, and a height of 50.0 mm.

Here, the battery shown in FIGS. 1A, 1B and 2 will be explained. The positive electrode 1 and the negative electrode 2 are spirally wound with interposing the separator 3 therebetween, as described above, and the spirally wound electrode body is pressed in a flat form to form the electrode laminate 6 having a flat spiral structure. The laminate 6 together with a nonaqueous electrolytic solution is contained in the box-shaped battery case 4. For simplicity, in FIG. 1, metal foils as current collectors used to form the positive electrode 1 and the negative electrode 2, and the electrolytic solution are not depicted.

The battery case 4 is made of an aluminum alloy, and constitutes a main part of the exterior package of the battery. This battery case 4 also functions as a positive electrode terminal. The insulator 5 made of a polytetrafluoroethylene sheet is arranged on the inside bottom of the battery case 4. The positive electrode lead member 7 and the negative electrode lead member 8 connected to one end of the positive electrode 1 and that of the negative electrode 2, respectively, are taken out from the electrode laminate 6 having the flat spiral structure. The terminal 11 made of stainless steel is attached to the cover plate 9 made of aluminum for closing the opening of the battery case 4 with interposing the insulation packing 10 made of polypropylene therebetween. The lead plate 13 made of stainless steel is attached to this terminal 11 with interposing the insulator 12 therebetween.

The cover plate 9 is inserted into the opening of the battery case 4, and their joining portions are welded to each other, thereby closing the opening of the battery case 4 to make the interior of the battery airtight. In the battery shown in FIGS. 1A and 1B, the inlet 14 for pouring the electrolytic solution is made in the cover plate 9, and the inlet 14 is welded and sealed up by, for example, laser welding, with inserting a sealing member (not shown). In this way, the air-tightness of the battery is kept. Accordingly, in the case of the battery shown in FIGS. 1A, 1B and 2, the electrolytic solution pouring inlet 14 is actually composed of the inlet 14 and the sealing member, but the inlet 14 is illustrated as such without a sealing member in order to make the figure simple. The explosion-proof vent 15 is made in the cover plate 9.

In the battery 1 of Example 1, the positive electrode lead member 7 is directly welded to the cover plate 9, whereby the combination of the battery case 4 and the cover plate 9 functions as a positive electrode terminal. The negative electrode lead member 9 is welded to the lead plate 13, and the negative electrode lead member 8 and the terminal 11 are made electrically conductive through the lead plate 13, whereby the terminal 11 functions as a negative electrode terminal. However, the functions of the positive and negative electrodes may be reversed in accordance with the material of the battery case 4, etc.

FIG. 2 is a perspective view schematically illustrating the external appearance of the battery shown in FIGS. 1A and 1B. FIG. 2 shows that the above-mentioned battery is a rectangular battery. Thus, FIG. 2 schematically shows the battery, and depicts the specific elements out of the constituting elements of the battery.

Example 2

A nonaqueous secondary battery was fabricated in the same manner as in Example 1 except that the positive electrode active material (A) was changed to $LiCo_{0.9988}Mg_{0.0008}Ti_{0.0004}O_2$ (average particle size: 5 μm), and the positive electrode active material (B) was changed to $LiCo_{0.9964}Mg_{0.0024}Ti_{0.0012}O_2$ (average particle size: 5 μm) and the positive electrode active material (C) as changed to $LiCo_{0.9960}Mg_{0.0027}Ti_{0.0013}O_2$ (average particle size: 1 μm).

The density of the positive electrode mixture layers (the density of the positive electrode) was 3.95 g/cm³ after the pressing under the same pressure as in Example 1. The thickness of the positive electrode mixture layers (the thickness of the layers on both the surfaces, i.e., the thickness obtained by subtracting the thickness of the aluminum foil layer of the positive electrode current collector from the total thickness of the positive electrode) was 130 μm.

Example 3

A nonaqueous secondary battery was fabricated in the same manner as in Example 1 except that the positive electrode active material (A) was changed to $LiCo_{0.998}Mg_{0.0008}Ti_{0.0004}O_2$ (average particle size: 18 μm), the positive electrode active material (B) was changed to an oxide having the same composition as the positive electrode active material (A) and having an average particle size of 5 μm, and the positive electrode active material (C) was changed to an oxide having the same composition as the positive electrode active material (A) and having an average particle size of 1 μm.

The density of the positive electrode mixture layers (the density of the positive electrode) was 3.95 g/cm³ after pressing at the same pressure as in Example 1. The thickness of the positive electrode mixture layers (the thickness of the layers on both the surfaces, i.e., the thickness obtained by subtracting the thickness of the aluminum foil layer of the positive electrode current collector from the total thickness of the positive electrode) was 130 μm.

Example 4

A nonaqueous secondary battery was fabricated in the same manner as in Example 1 except that the positive electrode active material (A) was changed to $LiCo_{0.9988}Mg_{0.0008}Ti_{0.0004}O_2$ (average particle size: 18 μm), the positive electrode active material (B) was changed to an oxide having the same composition as the positive electrode active material (A) and having an average particle size of 5 μm, and the positive electrode active material (C) was changed to an oxide having the same composition as the positive electrode active material (A) and having an average particle size of 1 μm.

The density of the positive electrode mixture layers (the density of the positive electrode) was 3.80 g/cm³ after the pressing at a lower pressure than in Example 1. The thickness of the positive electrode mixture layers was 135 μm.

Comparative Example 1

A nonaqueous secondary battery was fabricated in the same manner as in Example 1 except that the positive electrode active materials were changed to a mixture wherein the following were mixed: $LiCo_{0.9988}Mg_{0.0008}Ti_{0.0004}O_2$ (average particle size: 18 μm) as the positive electrode active material (A); and an oxide having the same composition as the positive electrode active material (A) and having an average particle size of 5 μm as the positive electrode active material (B).

The density of the positive electrode mixture layers (the density of the positive electrode) was 3.70 g/cm³ after the pressing under the same conditions as in Example 4. The thickness of the positive electrode mixture layers was 138 μm.

In each of Examples 1 to 4 and Comparative Example 1, plural nonaqueous secondary batteries having the same structures as described above were prepared, and then their characteristics were evaluated as follows:

Discharge Capacity

Each of the batteries fabricated in Examples 1 to 4 and Comparative Example 1 was charged at a constant current of 0.2 C up to 4.4 V, and then charged at a constant voltage until the total charge time reached 8 hours. Subsequently, the battery was discharged at a constant current of 0.2 C down to a voltage of 3.3 V. At this time, the discharge capacity was measured. The results are shown in Table 1. In Table 1, the discharge capacity obtained in each battery is shown as a relative value in relation to the discharge capacity of the battery of Comparative Example 1, which is "100".

Discharge Capacity After Charge-Discharge Cycles

With each of the batteries fabricated in Examples 1 to 4 and Comparative Example 1, charge and discharge were repeated 50 times under the same conditions as those in the evaluation of discharge capacities above. The discharge capacity in the 50th cycle was used to evaluate the discharge capacity after the charge-discharge cycles. The results are shown in Table 2. In Table 2, the discharge capacity after the charge-discharge cycles obtained about each of the battery is shown as a relative value in relation to the discharge capacity of the battery of Comparative Example 1 after the charge-discharge cycles, which is "100".

Safety Test

With each of the batteries fabricated in Examples 1 to 4 and Comparative Example 1, an overcharging test was conducted at 1 C and 12 V. The highest temperature (surface temperature) generated by the battery in the test was measured. The results are shown in Table 3. The lower surface temperature means the higher safety of the battery in the case of overcharging.

TABLE 1

| Charge voltage: 4.4 V | |
| --- | --- |
| Example No. | Discharge Capacity |
| Example 1 | 105 |
| Example 2 | 104 |
| Example 3 | 104 |
| Example 4 | 102 |
| Comparative Example 1 | 100 |

TABLE 2

| Example No. | Discharge capacity after charge-discharge cycles |
| --- | --- |
| Example 1 | 117 |
| Example 2 | 115 |
| Example 3 | 110 |
| Example 4 | 104 |
| Comparative Example 1 | 100 |

TABLE 3

| Example No. | Highest temp. ((C.) |
| --- | --- |
| Example 1 | 121 |
| Example 2 | 130 |
| Example 3 | 125 |
| Example 4 | 131 |
| Comparative Example 1 | 131 |

The nonaqueous secondary battery of Comparative Example 1, which had the positive electrode comprising two lithium-containing transition metal oxides having different average particle sizes as the positive electrode active materials, had the lower density of the positive electrode mixture layers than the nonaqueous secondary batteries of Examples 1 to 4 according to the present invention. This is also apparent from the fact that the positive electrode mixture layers in Comparative Example 1 had a lower density than that of the positive electrode mixture layers in Example 4, which was formed under the same pressing pressure as in Comparative Example 1. It is also seen from the results of Table 1 that the battery of Comparative Example 1 had a smaller capacity by about 2 to 5% than the batteries of Examples 1 to 4. Thus, the nonaqueous secondary batteries of Examples 1 to 4, which had a positive electrode containing, as its positive electrode active materials, three lithium-containing transition metal oxides having different average particle sizes, achieved the high capacity.

In the nonaqueous secondary battery of Example 1, the highest temperature generated in the safety test was lower than that generated by the nonaqueous secondary battery of Comparative Example 1. Thus, the former battery has better safety than the latter. Furthermore, the nonaqueous secondary batteries of Examples 1 to 4 also exhibited a high discharge capacity after the charge-discharge cycles, and thus had a good charge-discharge cycle characteristics. In the case that the additive element, aluminum, is not contained as in Example 2, the highest temperature generated by the battery was higher than that in Example 1. Thus, it is understood that the safety can be increased by the addition of aluminum.

In the nonaqueous secondary battery of Example 1, in which the content of the metal element $M^2$ in the positive electrode active material (C) having the smallest average particle size is larger than that in the positive electrode active material (A) or (B), the safety (the highest temperature generated by the battery exhibits) and the charge-discharge cycle characteristics are better than in the nonaqueous secondary battery of Example 3, in which the content of the metal element $M^2$ was the same among the positive electrode active materials (A), (B) and (C).

The invention claimed is:

1. A nonaqueous secondary battery comprising: a positive electrode having a positive electrode mixture layer, a negative electrode, and a nonaqueous electrolyte, wherein the positive electrode comprises an active material consisting of at least three lithium-containing transition metal oxides having different average particle sizes and at least five inflection points in a particle size distribution curve of the mixture of said at least three lithium-containing transition metal oxides, wherein the lithium-containing transition metal oxides comprise at least one transition metal element $M^1$ selected from the group consisting of Co, Ni and Mn, and the transition metal element $M^1$ of the lithium-containing transition metal oxide having the smallest average particle size is partially substituted with a metal element $M^2$ other than the transition metal element $M^1$, wherein the transition metal element $M^2$ comprises Mg and at least one metal element selected from the group consisting of Ti, Zr, Ge, Nb, Al and Sn, wherein a content of the transition metal element $M^2$ in the lithium-containing transition metal oxide having the smallest average particle size is largest among said at least three lithium-containing transition metal oxides.

2. The nonaqueous secondary battery according to claim 1, wherein said transition metal element $M^1$ of at least one of the lithium-containing transition metal oxides other than one having the smallest average particle size is partially substituted with a metal element $M^2$ other than the transition metal element $M^1$.

3. A method of using a nonaqueous secondary battery according to any one of claims 1 to 2 comprising the step of:
   charging the battery so that a positive electrode voltage is in a range of 4.35 to 4.6 V with reference to the potential of lithium when the battery is fully charged.

4. The aqueous secondary battery according to claim 1, wherein the particle size of the lithium-containing transition metal oxide having the smallest average particle size is 0.5 to 4 μm.

5. The aqueous secondary battery according to claim 1, wherein the particle size of the lithium-containing transition metal oxide having the second largest average particle size is 2 to 10 μm.

6. The aqueous secondary battery according to claim 1, wherein the particle size of the lithium-containing transition metal oxide having the smallest average particle size is 0.5 to 4 μm, and the particle size of the lithium-containing transition metal oxide having the second largest average particle size is 2 to 10 μm.

7. The nonaqueous secondary battery according to claim 1, wherein the positive electrode comprises an active material consisting of three lithium-containing transition metal oxides having different average particle sizes.

8. The nonaqueous secondary battery according to claim 1, wherein a thickness obtained by subtracting a thickness of an electrode current collector from a total thickness of the positive electrode is from 30 to 200 μm.

9. The nonaqueous secondary battery according to claim 1, wherein a particle size of the lithium-containing transition metal oxide having the largest average particle size is 5 to 25 μm.

10. The nonaqueous secondary battery according to claim 1, wherein the density of the positive electrode mixture layer is at least 3.8 g/cm$^3$.

* * * * *